(12) United States Patent
Wallack

(10) Patent No.: US 6,219,461 B1
(45) Date of Patent: Apr. 17, 2001

(54) DETERMINING A DEPTH

(75) Inventor: Aaron S. Wallack, Natick, MA (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 09/014,771

(22) Filed: Jan. 28, 1998

Related U.S. Application Data

(60) Provisional application No. 60/054,113, filed on Jul. 29, 1997.

(51) Int. Cl.$^7$ .................................................. G06K 9/36
(52) U.S. Cl. ........................................ 382/285; 382/106
(58) Field of Search ................................... 382/285, 154, 382/106

(56) References Cited

U.S. PATENT DOCUMENTS

| | | | |
|---|---|---|---|
| 4,472,056 | 9/1984 | Nakagawa et al. | 356/376 |
| 4,640,620 | 2/1987 | Schmidt | 356/376 |
| 4,689,480 | 8/1987 | Stern | 250/201 |
| 4,876,455 | 10/1989 | Sanderson et al. | 250/560 |
| 4,893,183 | 1/1990 | Nayar | 358/107 |
| 4,912,336 | 3/1990 | Nayar et al. | 250/560 |
| 4,984,893 | 1/1991 | Lange | 356/376 |
| 4,988,202 | 1/1991 | Nayar et al. | 356/394 |

(List continued on next page.)

FOREIGN PATENT DOCUMENTS

| | | |
|---|---|---|
| 3413605 A1 | 10/1985 | (DE) . |
| 0 183 240 A2 | 6/1986 | (EP) . |
| 0 300 164 A1 | 1/1989 | (EP) . |
| 0 563 829 A2 | 10/1993 | (EP) . |
| 0 627 610 A1 | 12/1994 | (EP) . |
| 3-63507 | 8/1989 | (JP) . |
| 9-26312 | 8/1989 | (JP) . |
| 4-283608 | 3/1991 | (JP) . |
| 4-313008 | 4/1991 | (JP) . |
| 6-249632 | 2/1993 | (JP) . |
| 7-311025 | 5/1994 | (JP) . |
| 8-233544 | 2/1995 | (JP) . |
| 9-5048 | 6/1995 | (JP) . |
| 8-152308 | 9/1995 | (JP) . |
| 8-304043 | 9/1995 | (JP) . |
| 9-96512 | 9/1995 | (JP) . |
| 9-127420 | 11/1995 | (JP) . |
| WO 96/41304 | 12/1996 | (WO) . |

OTHER PUBLICATIONS

A. Pentland, S. Scherock, T. Darrell, and B. Girod. "Simple range cameras based on focal error," J. Opt. Soc. Am. A., vol. 11, No. 11, Nov. 1994, pp. 2925–2934.

B. Girod, and S. Scherock "Depth from Defocus of Structured Light," SPIE vol. 1194 Optics, Illumination, and Image Sensing for Machine Vision IV (1989), pp. 209–215.

P. Caber, "Interferometric profiler for rough surfaces," Applied Optics, vol. 32, No. 19, Jul. 1, 1993, pp. 3438–3441.

S. Nayer and Y. Nakagawa, "Shape from Focus," IEEE Transactions on Pattern Analysis and Machine Intelligence, vol. 16, No. 8, Aug. 1994, pp. 824–830.

Y. Xiong and S. Shafer, "Depth from Focusing and Defocusing," Proc. IEEE Conference on Computer Vision and Pattern Recognition 1993, pp. 68–73.

(List continued on next page.)

*Primary Examiner*—Yon J. Couso
(74) *Attorney, Agent, or Firm*—Anthony L. Miele; Richard C. Irving; Jason A. Reyes

(57) ABSTRACT

A three-dimensional image is derived from two-dimensional images. At least one of the two-dimensional images has a predetermined number of pixels. Depth measurements are derived from the two-dimensional images. The number of derived depth measurements is substantially equal to the predetermined number of pixels. The three-dimensional image is derived from the two-dimensional digital images and the depth measurements.

6 Claims, 14 Drawing Sheets

U.S. PATENT DOCUMENTS

| | | | |
|---|---|---|---|
| 5,151,609 | 9/1992 | Nakagawa et al. | 250/561 |
| 5,239,178 | 8/1993 | Derndinger et al. | 250/234 |
| 5,248,876 | 9/1993 | Kerstens et al. | 250/561 |
| 5,424,835 | 6/1995 | Consnard et al. | 356/376 |
| 5,546,189 | 8/1996 | Svetkoff et al. | 356/376 |
| 5,589,942 | 12/1996 | Gordon | 356/376 |
| 5,617,209 | 4/1997 | Svetkoff et al. | 356/376 |
| 5,642,293 * | 6/1997 | Manthey et al. | 382/285 |
| 5,659,420 | 8/1997 | Wakai et al. | 359/368 |
| 5,878,152 * | 3/1999 | Sussman | 382/106 |
| 5,930,383 * | 7/1999 | Netzer | 382/285 |
| 6,025,905 * | 2/2000 | Sussman | 382/106 |

OTHER PUBLICATIONS

J. Wyant, "How to extend interferometry for rough surface tests," Laser Focus World, Sep. 1993, pp. 131–133.

J.–A. Beraldin, M. Rioux, F. Blais, and R. A. Couvillon, "Digital Three–dimensional Imaging in the Infared at the National Research Council of Canada," SPIE vol. 2269 Infrared Technolog XX (1994), pp. 208–225.

Z.J. Geng, "Rainbow three–dimensional camera: new concept of high–speed three–dimensional vision systems," Optical Engineering, vol. 35 No. 2, Feb. 1996, pp. 376–383.

M. Watanabe and S. Nayar, "Telecentic Optics for Constant–Magnification Imaging," Technical Report CUCS–026–95, Dept. of Computer Science, Columbia University, New York, NY, USA, Sep. 1995.

M. Watanabe, S. Nayar, and M. Noguchi, "Active Focus Range Sensor," Implementation Technical Note, Dept. of Computer Science, Columbia University, New York, NY, USA, Jun. 1995.

M. Watanabe, S. Nayar, and M. Noguchi, "Real–time computation of depth from defocus," Proc. of SPIE v 2599, 1996, pp. 14–25.

S. Nayar, M. Watanabe, and M. Noguchi, "Real–Time Focus Range Sensor," IEEE Transactions on Pattern Analysis and Machine Intelligence, vol. 18, No. 12, Dec. 1996, pp. 1186–1198.

M. Noguchi and S. Nayar, Microscopic Shape from Focus Using Active Illumination, Proc. IEEE Conference on Computer Vision and Image Processing 1994, pp. 147–152.

M. Subbarao and G. Surya, "Depth from Defocus: A Spatial Domain Approach," International Journal of Computer Vision, 13,3, 1994, pp. 271–294.

R. Stone and S. Shafer, "Surface Roughness Estimation," The Robotics Institute, Carnegie Mellon University, Pittsburgh, PA, USA.

A. Pentland, "A New Sense for Depth of Field," IEEE Transactions on Pattern Analysis and Machine Intelligence, vol. PAMI–9, No. 4, Jul. 1987, pp. 523–531.

M. Ishihara and H. Sasaki, "High Speed 3–D Shape Measuring Apparatus using Shape from Focus Method," Seimitsu Kogaku Kaishi (Precision Engineering Journal), vol. 63, No. 1, 1997, pp. 124–128.

"Confocal Microscopy," Optical Instruments, pp. 17.40–17.43.

R. Webb, "Confocal Microscopes," Optics & Photonics News, Jul. 1991, pp. 8–13.

R. Schneider, A. Schick, P. Kollensperger, and T. Ninomiya, "High–speed optical three–dimensional scanner for automatic solder joint inspection," Optical Engineering, vol. 36, No. 10, Oct. 1997, pp. 2878–2885.

M. Ishihara, "High Speed 3–D Shape Measurement for a Small Object," Dai Ni–kai Gazou Senshing Shinpojiumu Kouen Ronbunshuu (Collection of the Lectures at the 2nd Image Sensing Symposium), Jun. 1996, pp. 155–158.

M. Ishihara and H. Sasaki, "High Speed 3–D Shape Measurement Using Non–Scanning Multibeam Confocal Lens Systems," Dai San–kai Gazou Senshing Shinpojiumu Kouen Ronbunshuu (Collection of the Lectures at the 3rd Image Sensing Symposium).

T. Yamashita and H. Nakashima; M. Nagashima and K. Nishiuchi, "Measuring longitudinal displacements using laser beam diffraction changes near the focal point," Rev. Sci. Instrum., vol. 64, No. 8, Aug. 1993, pp. 2245–2249.

Patent Abstracts of Japan, vol. 8, No. 6 (P247) '1443!, Jan. 12, 1984 & JP 58 169008 A (Nippon Denki K.K.), Oct. 5, 1983.

* cited by examiner

DETERMINING A DEPTH

CROSS REFERENCE TO RELATED APPLICATIONS

This application claims the benefit of U.S. Provisional Patent Application Serial No. 60/054,113, filed on Jul. 29, 1997, which is incorporated by reference.

BACKGROUND OF THE INVENTION

The invention relates to determining a depth.

Determining a depth or a distance, also known as range sensing, is important in, e.g., industrial applications such as measurement of solder paste volume in manufacturing surface-mounted electronic assemblies, digitization of three-dimensional ("3-D") clay models, and inspection of semiconductor packages for lead coplanarity.

Electronic devices that have traditional electrical terminals (e.g., dual in-line package leads) may be inspected in two dimensions using backlight. However, some devices that have other types of electrical terminals such as ball grid array balls cannot be effectively inspected using backlight. Instead these devices are inspected by an imaging system that can view the terminals in three dimensions to check for compliance with specifications for, e.g., height, volume, and shape.

Optical systems have been devised that allow 3-D images to be derived from two-dimensional ("2-D") images, by exploiting optical principles that relate the extent to which a surface is out-of-focus to a distance between the surface and an in-focus point. With such systems, resulting depth information in each of the derived 3-D images has only a fraction of the resolution of each of the 2-D images (e.g., only 512×512 points of depth information from 1024×1024 2-D images). Thus, to derive depth information having only moderate resolution, such systems are compelled to use costly high-resolution cameras that can produce the necessary high-resolution 2-D images.

SUMMARY OF THE INVENTION

In general, in one aspect, the invention features a method for deriving a three-dimensional image from two-dimensional images, at least one of the two-dimensional images having a predetermined number of pixels. The method includes: deriving focus-based depth measurements from the two-dimensional images, the number of derived focus-based depth measurements being substantially equal to the predetermined number of pixels; and from the two-dimensional digital images and the depth measurements, deriving the three-dimensional image.

Implementations of the invention may include one or more of the following features. The method may further include deriving a focus measurement for each pixel in the predetermined number of pixels. The method may further include deriving each focus-based depth measurement from the focus measurements. The three-dimensional image may include information about a subject and each of the two-dimensional images may include different information about the subject. The method may further include imposing structured illumination on the subject and producing the two-dimensional images from the subject under the structured illumination. The method may further include, for each of the two-dimensional images, imposing different structured illumination on the subject. Each instance of imposed structured illumination may include a same pattern having a spatial period, and, for the instances of imposed structured illumination, the respective positions of the pattern relative to the subject may differ by a fraction of the spatial period. The fraction may include a multiple of a quarter of the spatial period. The subject may bear a contrast pattern, and the method may further include, in the derivation of the focus-based depth measurements, excluding at least some information about the contrast pattern.

In general, in another aspect, the invention features a method for use in determining a depth. The method includes taking three sample values of a characteristic of an area defined by a pixel, each sample value corresponding to a different position of structured illumination relative to the area.

Implementations of the invention may include one or more of the following features. The structured illumination may include a pattern having a spatial period, and each of the different positions may differ by a fraction of the spatial period. The method may further include, from the three sample values, deriving a computed value representing a result of illuminating the area with unstructured illumination. The method may further include, from the three sample values and the computed value, deriving normalized sample values representing respective results of illuminating the area with the structured illumination at positions differing by the fraction of the spatial period. The method may further include, from the normalized sample values, deriving a focus measure representing a relative distance. The spatial period may be at least as long as four times a length defined by the pixel.

In general, in another aspect, the invention features a method for use in processing a digital image. The method includes: imposing structured illumination on a subject, producing two-dimensional images from the subject under the structured illumination, at least one of the two-dimensional images having a predetermined resolution, each of the two-dimensional images including different information about the subject, from the two-dimensional digital images, deriving focus measurements, from the focus measurements, deriving depth measurements, and from the two-dimensional digital images and the depth measurements, deriving a three-dimensional image having the predetermined resolution.

In general, in another aspect, the invention features a method for use in determining a depth. The method includes: taking three sample values of a characteristic of an area defined by a pixel, each sample value corresponding to a different position of structured illumination relative to the area, the structured illumination including a pattern having a spatial period, each of the different positions differing by a fraction of the spatial period; from the three sample values, deriving a computed value representing a result of illuminating the area with unstructured illumination; from the three sample values and the computed value, deriving normalized sample values representing respective results of illuminating the area with the structured illumination at positions differing by the fraction of the spatial period; and from the normalized sample values, deriving a focus measure representing a relative distance.

Among the advantages of the invention are one or more of the following. A CCD sensor having a 512×512 pixel array can be used to produce a 512×512 depth image (i.e., 512×512 points of depth information). With little or no modification to hardware, some existing systems for producing depth images can be upgraded to produce higher-resolution depth images. A depth image can be created by using a simple patterned mask that changes sinusoidally from dark to light. Large groups of electrical terminals can be effectively inspected by using conventional CCD sensors.

Other advantages and features will become apparent from the following description and from the claims.

DESCRIPTION OF THE PREFERRED EMBODIMENTS

Figure 1:
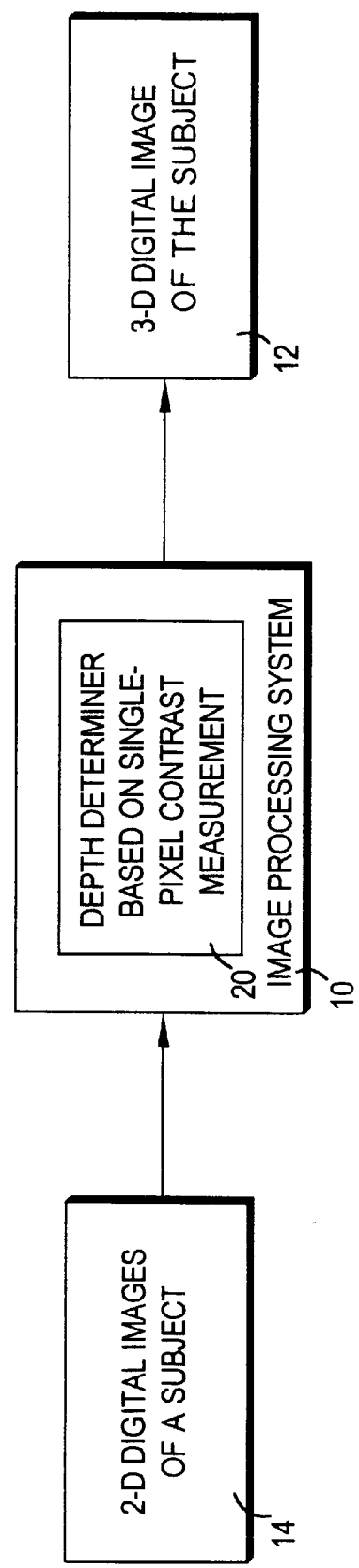
FIG. 1 is a block diagram of an image processing system.
Figure 2:
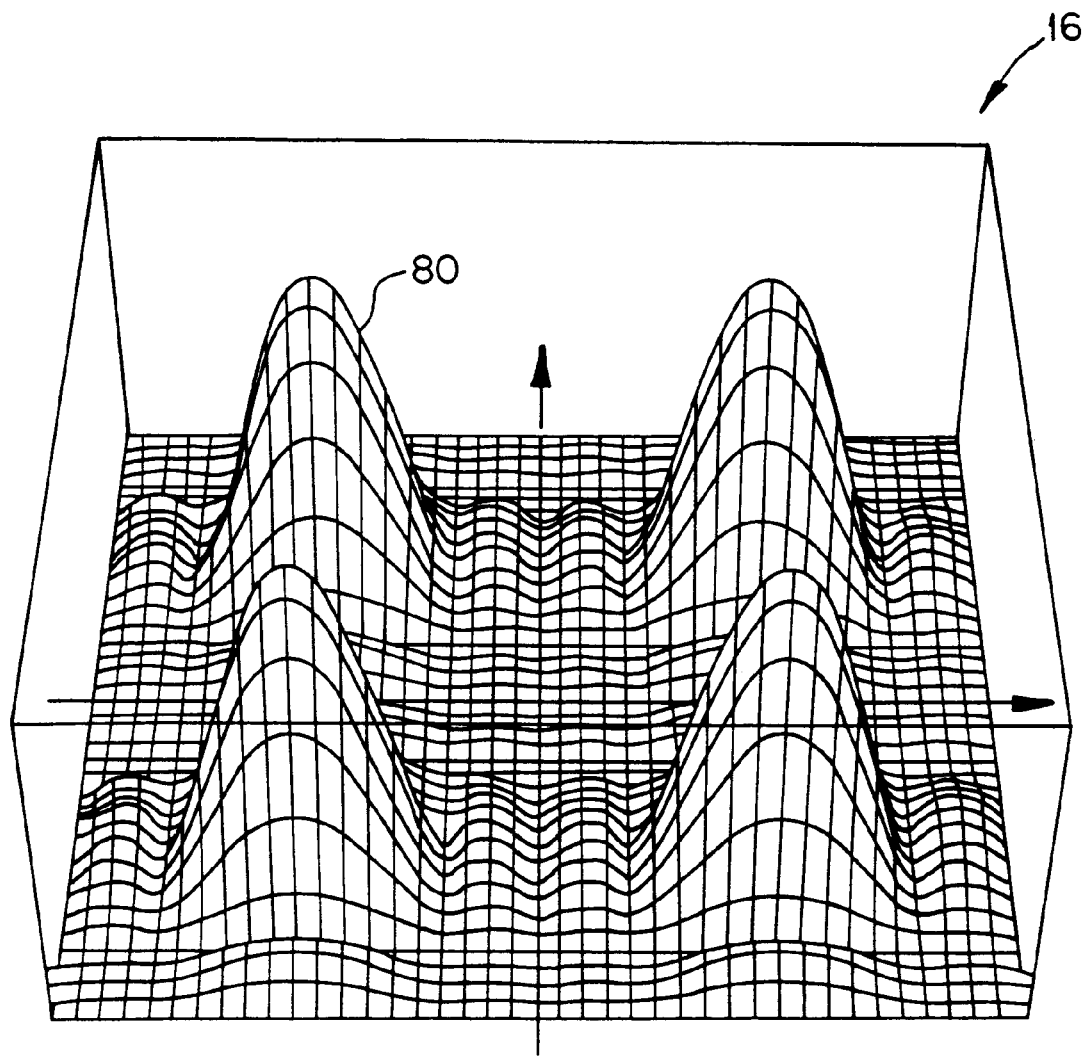
FIG. 2 is an illustration of a 3-D digital image.
Figure 3:
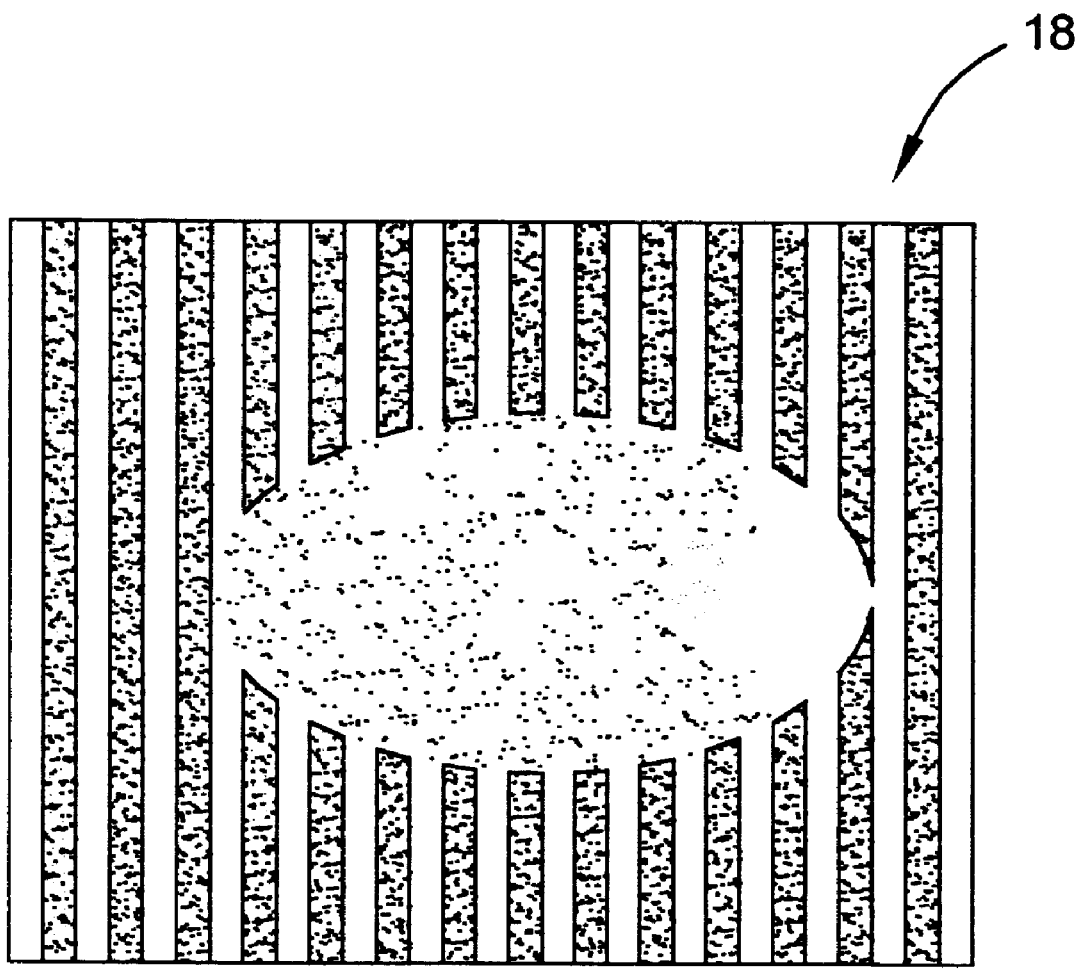
FIG. 3 is an illustration of a 2-D digital image.

FIG. 1 shows an image processing system 10 that derives a three-dimensional ("3-D") digital image 12 of a subject (e.g., at least a portion of image 16 of FIG. 2) from two-dimensional ("2-D") digital images 14 of the subject (e.g., image 18 of FIG. 3). The image processing system 10 includes a depth determiner 20 that is based on a single-pixel contrast measurement, as described below. Generally, the depth determiner 20 relies on the principle that the further a surface is from an in-focus position, the more out-of-focus the surface becomes, in a predictable way. See Watanabe, Nayar, and Noguchi, "Real-time computation of depth from defocus", Proc. of the SPIE, vol. 2599:A-03 (November 1995).

Figure 4:
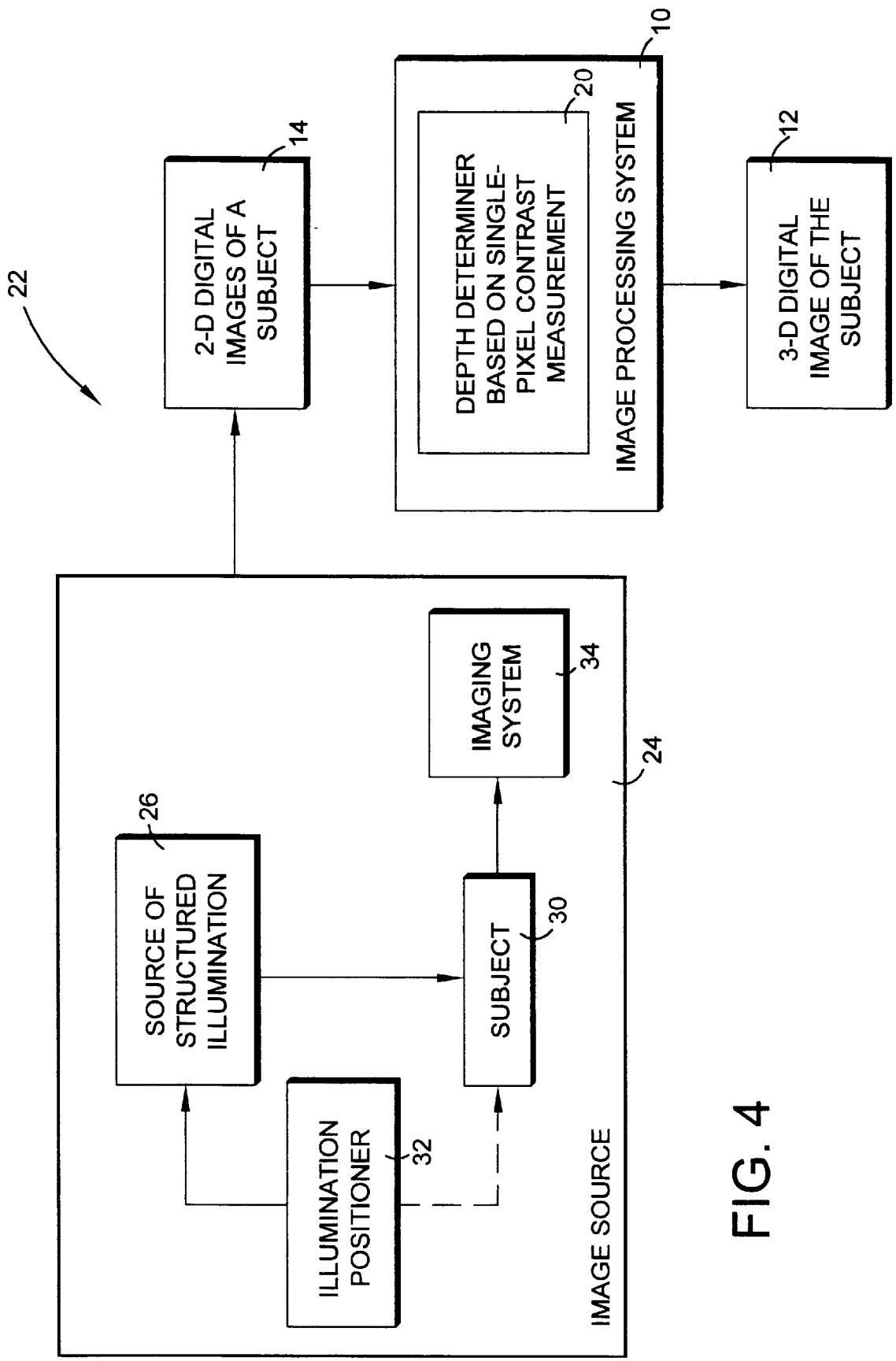
FIG. 4 is a block diagram of a 3-D imager.
Figure 5:
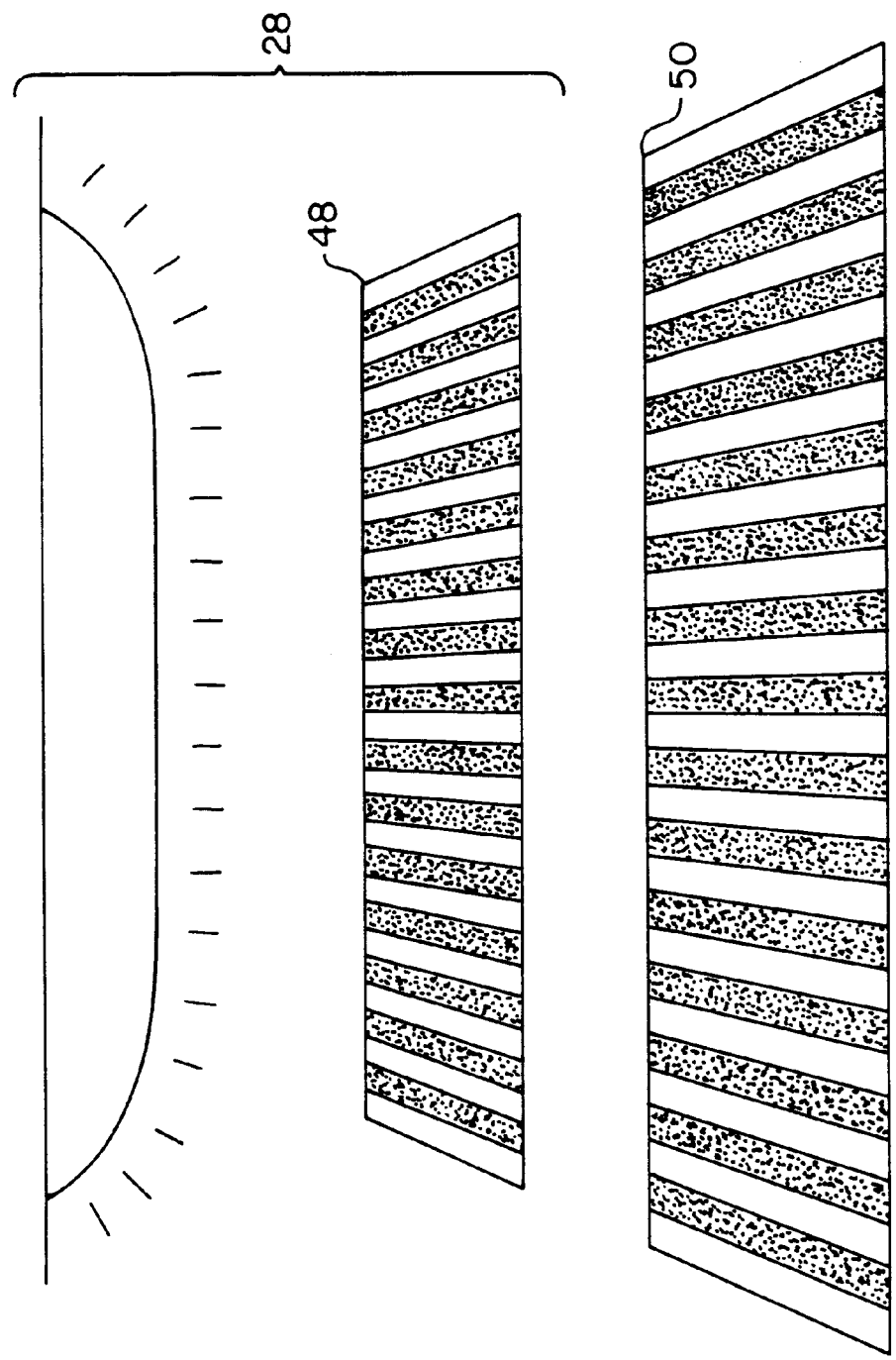
FIG. 5 is a diagram of a structured illumination projector.

As shown in FIG. 4, the image processing system 10 may be included in 3-D imager 22 that also includes image source 24 which produces the 2-D digital images 14. As described below, the image source 24 includes a source of structured illumination 26 ("illumination projector") (e.g., projector 28 of FIG. 5 or projector 37 of FIG. 6), a subject 30 (e.g., a ball grid array of solder balls) illuminated by the illumination projector, an illumination positioner 32 for changing the position of the illumination relative to the subject (e.g., by shifting the subject), and an imaging system 34 (e.g., a digital camera or system 54 of FIG. 6) for producing 2-D digital images of the subject.

Figure 6:
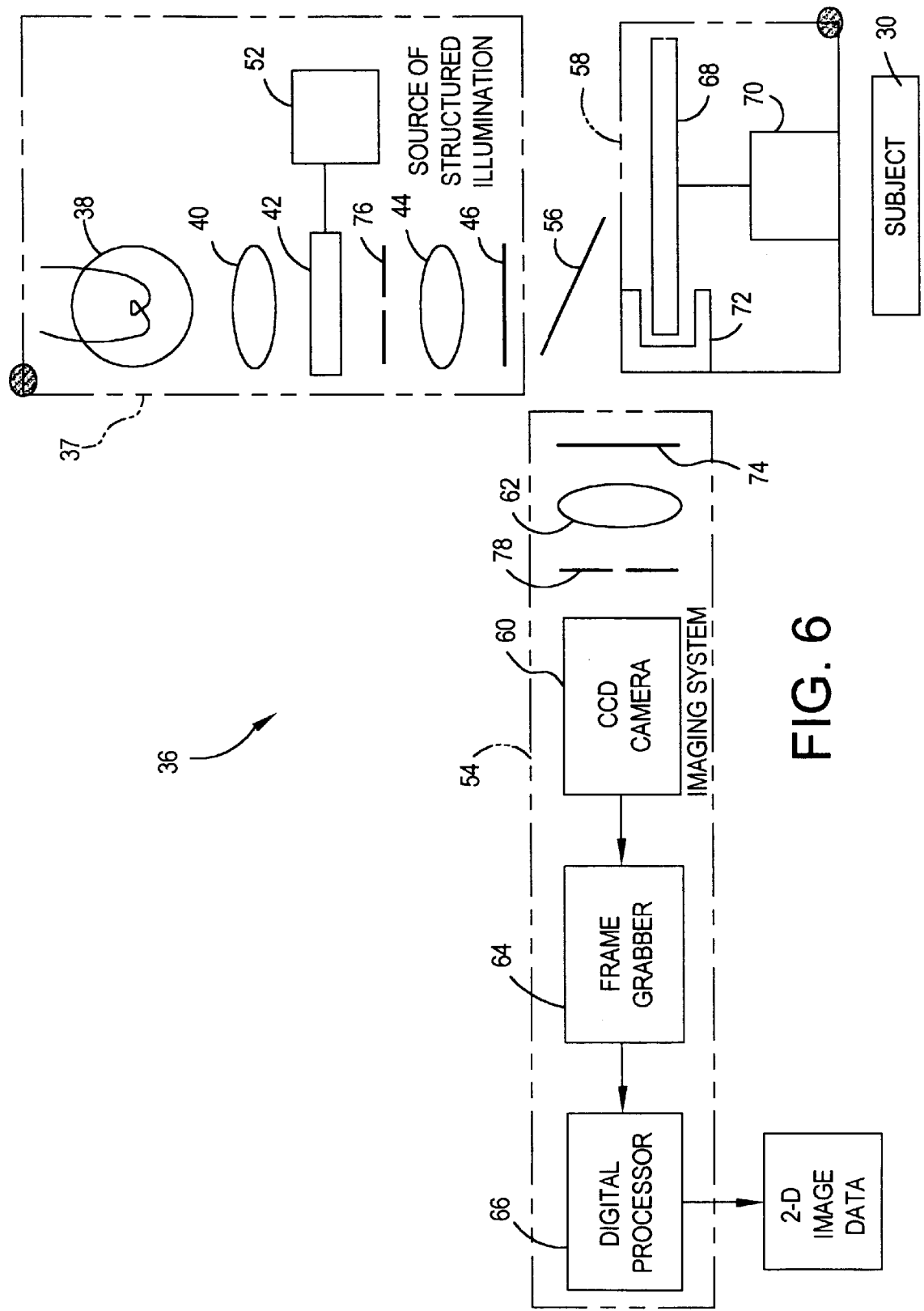
FIG. 6 is a block diagram of an implementation of an image source.

FIG. 6 illustrates an implementation 36 of the image source 24, including projector 37 having a light source 38, collimating optics 40 to efficiently gather light from the light source 38, a patterned mask 42 (e.g., in FIG. 5, mask 48 having a series of alternating, equal-width transparent and opaque "zebra" stripes), and a projection lens 44. Projector 37 imposes a light pattern of known spatial frequency and period (e.g., pattern 50 of FIG. 5) on the subject 30. The light pattern serves as artificial texture (i.e., artificial edges) or another object feature to allow the depth determiner 20 to derive a measure of focus or defocus and therefore depth, as described below. In implementation 36, projector 37 includes a piezo-electric element 52 that is in contact with the patterned mask 42 to serve as the illumination positioner 32 to move the patterned mask 42 quickly through small distances, each move corresponding to one of the 2-D digital images, as explained below.

Implementation 36 also includes imaging system 54, a beam splitter 56 for allowing system 54 to share the optical path of the projector 37, and an optical path length changer 58 for changing focal distance and therefore the optical length of the optical path. Imaging system 54 includes an imaging system lens 62, a CCD camera 60 for converting light to electric signals, a frame grabber 64 for capturing sets of digital values from the electric signals, and a digital processor 66 for deriving the 2-D digital images from the sets of digital values.

Optical path length changer 58 includes a sector wheel 68 of glass plates having different respective indices of refraction, a motor 70 rotating the sector wheel 68, and an optical interrupter 72 for synchronizing the derivation of the 2-D digital images with the rotation of the sector wheel 68.

Projector 37 and system 54 also include polarizers 46 and 74, respectively, and apertures 76 and 78, respectively, to facilitate the production of the 2-D digital images, as described in co-pending U.S. patent application Ser. No. 08/859,854, filed May 20, 1997 and entitled "Depth From Focal Gradient Analysis Using Object Texture Removal by Albedo Normalization" ("Albedo Normalization application") and applications cited there. These applications also provide additional details about the components described above, and are incorporated by reference.

Each 2-D digital image is made up of image elements (i.e., pixels), wherein each image element has a corresponding value (e.g., brightness value). The number of image elements in a 2-D digital image is known as the resolution of the image. For example, if a 2-D digital image is made up of image elements organized into A columns and B rows (e.g., 30 columns and 20 rows in FIG. 7), the resolution of the image is A×B (i.e., 30×20 in FIG. 7). Each image element defines not only a point at which a depth is determined as explained below, but also the portion of the surface of the subject that is depicted in the 2-D digital image. Since all of the 2-D digital images described below have the same resolution and organization, each image element of one of the 2-D digital images has a corresponding similarly-positioned image element in each of the other 2-D digital images. Therefore, below, the values of the corresponding image elements are referred to as multiple values of the same image element.

As described below, by deriving a contrast measurement for each image element from multiple images of the object acquired at different optical lengths, the image processing system 10 determines a depth (i.e., a z-position) at each point defined by each image element. For example, image 18 of FIG. 3 indicates stripes that are sharp and distinct (i.e., demonstrate high contrast) in most areas, but are indistinct (i.e., "fuzzy") in a roughly central, football-shaped area. Thus, according to image 18, a raised object (e.g., object 80 of FIG. 2) is surrounded by a substantially flat surface.

As shown in FIG. 3, in each of the 2-D digital images, if the surface on which the light pattern is incident is out of focus, the light pattern is smeared. The extent to which the pattern is smeared is a function of the extent to which the surface is out of focus. For example, the pattern mask may be periodic and may vary sinusoidally from complete transmittance to zero transmittance (e.g., a pattern mask having a period 96 shown in FIG. 12). If so, the light pattern in the 2-D digital image appears to vary periodically and sinusoidally, producing a large difference between maximum and minimum intensities for in-focus portions of the surface and smaller such differences for out-of-focus portions. As explained below, contrast is measured at each point on the surface by dividing the small difference associated with the point by the large difference.

Figure 8:
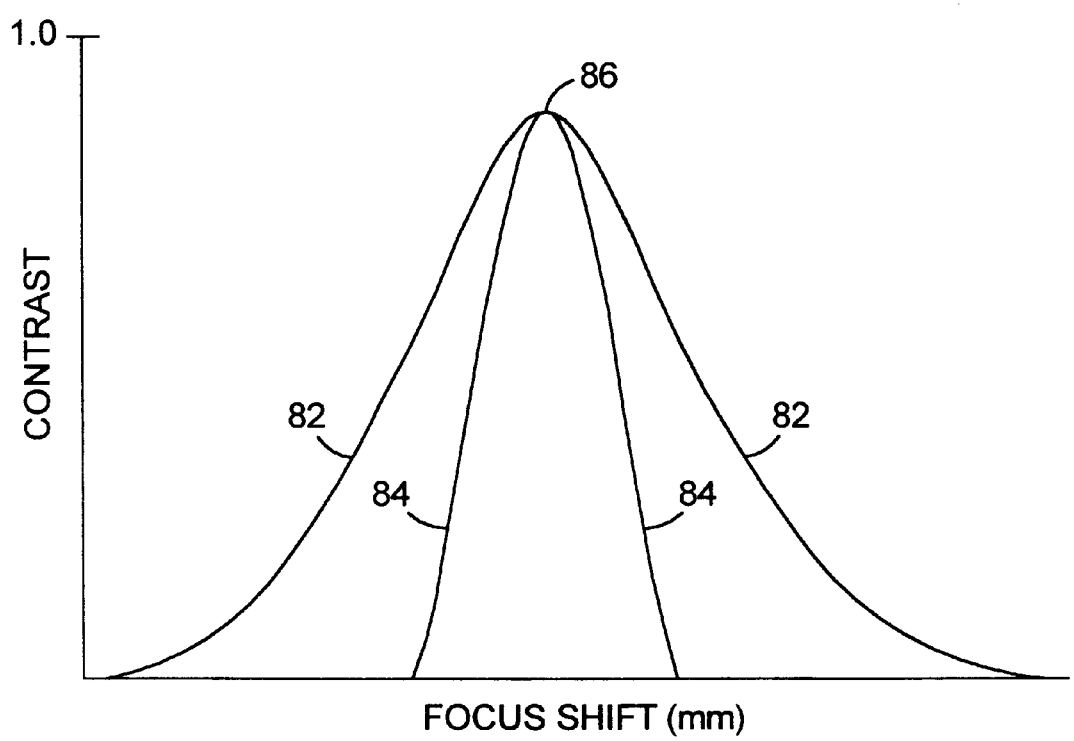
FIG. 8 is an illustration of a relationship between contrast and focus shift.

In FIG. 8, curves 82 and 84 that share a peak 86 illustrate the relationship between distance (i.e., depth) and contrast for two different apertures, as described in the Albedo Normalization application. The extent to which a surface corresponding to an image element is out-of-focus is determined by a contrast measurement for the image element.

As described below, the depth determiner 20 operates by producing a 2-D digital image such as image 18 in which the structured illumination pattern imposed on the subject is not significantly marred by any dark-and-light patterns (e.g., a light-colored object against a dark-colored background) already existing on the subject. Such a 2-D digital image is produced by "subtracting out" the already-existing patterns by albedo normalization which is described in the Albedo Normalization application and applications cited there.

Figure 7:
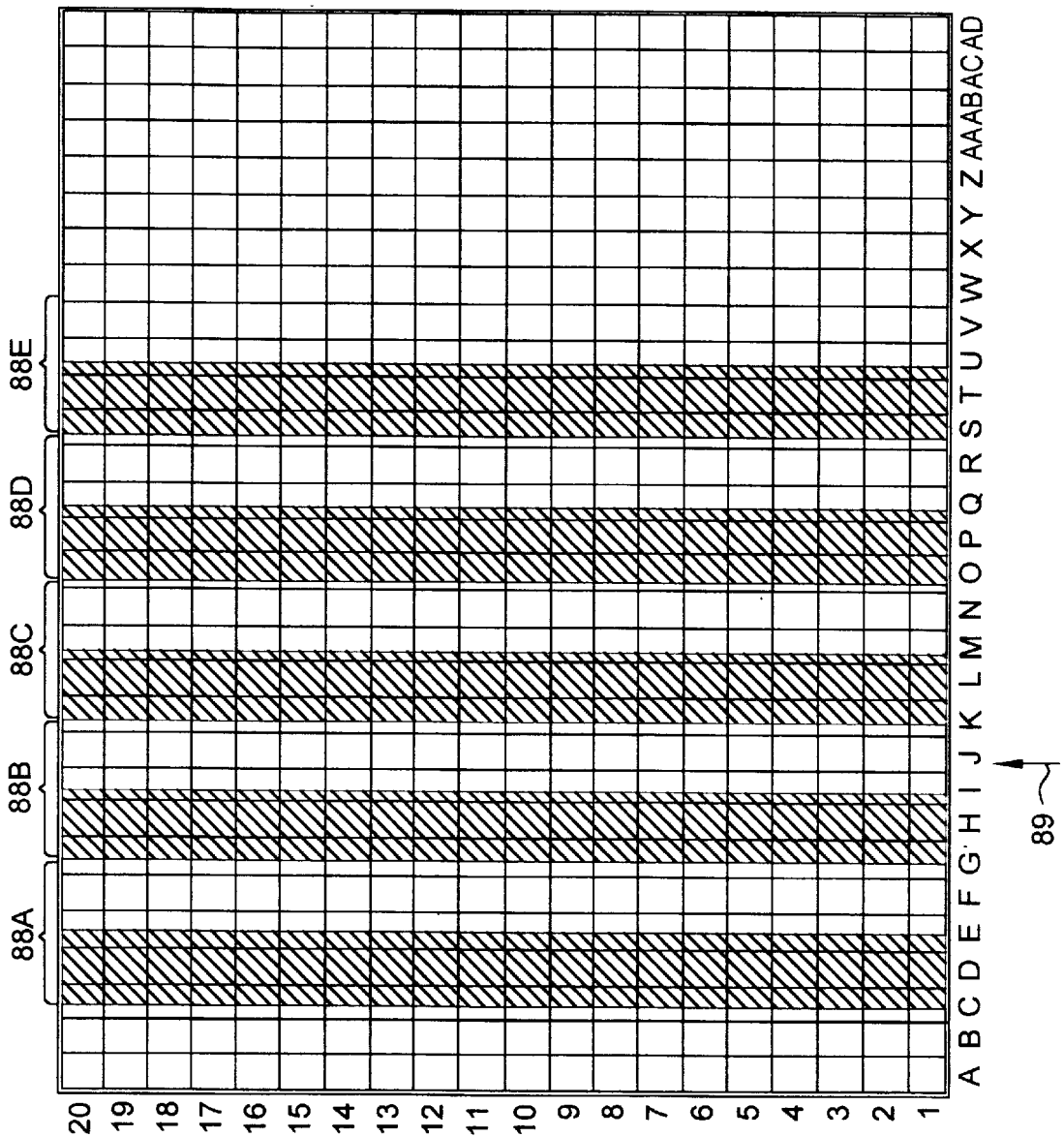
FIG. 7 is an illustration of a relationship between structured illumination and a 2-D digital image.
Figure 9:
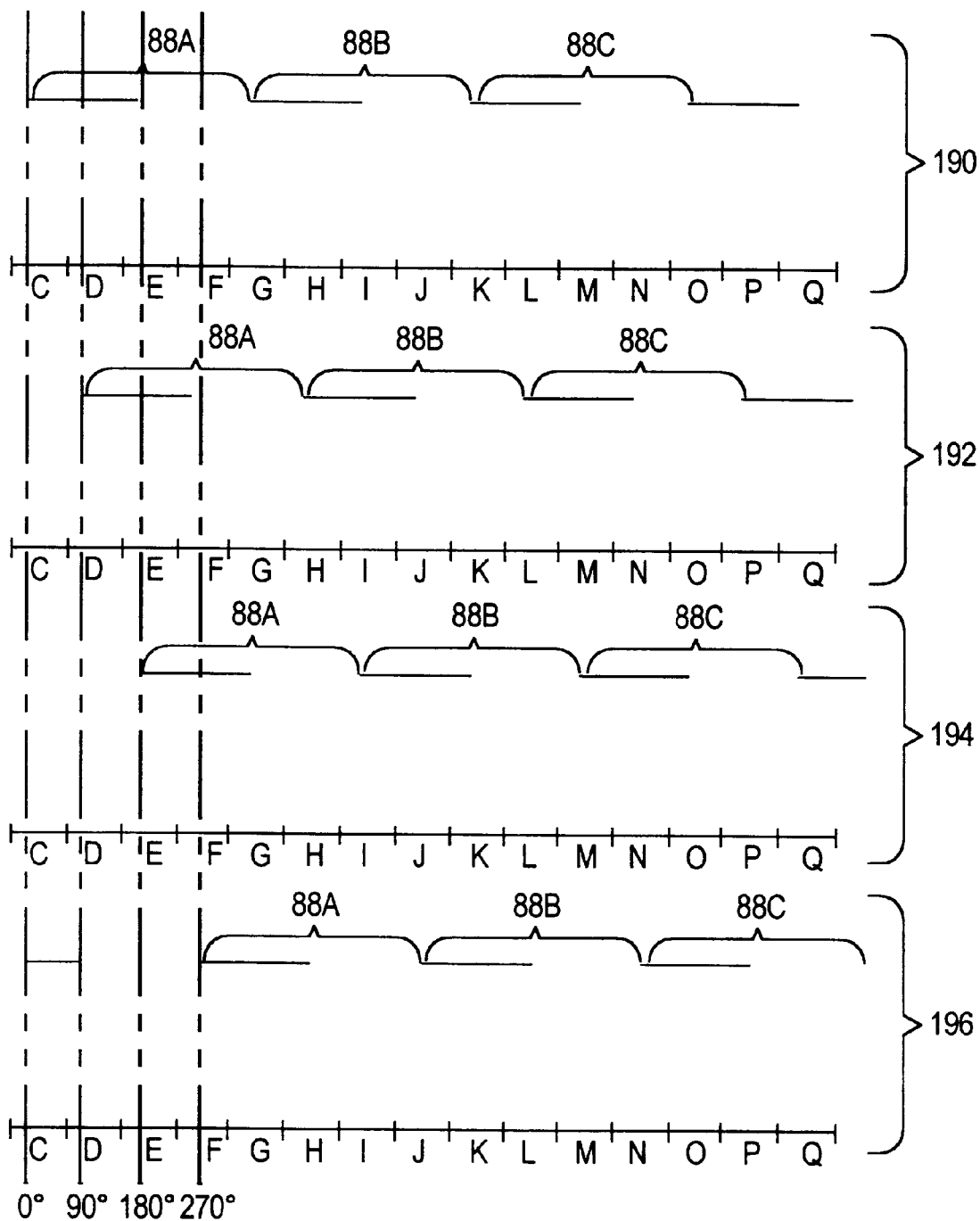
FIG. 9 is an illustration of relationships between structured illumination and a 2-D digital image.

FIG. 7 shows a relationship between the structured illumination pattern and the 2-D digital images according to the optics described above with respect to implementation 36. The pattern is repetitive and has a spatial period of four image elements, which is evident in FIG. 7 for the set of periods 88A–88E shown. In FIG. 9, portion 190 reveals a side view of the relationship shown in FIG. 7, i.e., a view indicated by arrow 89 in FIG. 7. For example, both FIG. 7 and portion 190 show that period 88C partially overlaps columns K and O and fully overlaps columns L–N.

FIG. 7 and portion 190 illustrate the set in a 0 degrees phase position with respect to the image elements. Portions 192, 194, and 196 show the set in 90, 180, and 270 degrees phase positions, respectively, relative to the image elements. Portions 190, 192, 194, and 196 also correspond to different respective 2-D digital images, as described below.

Figure 10:
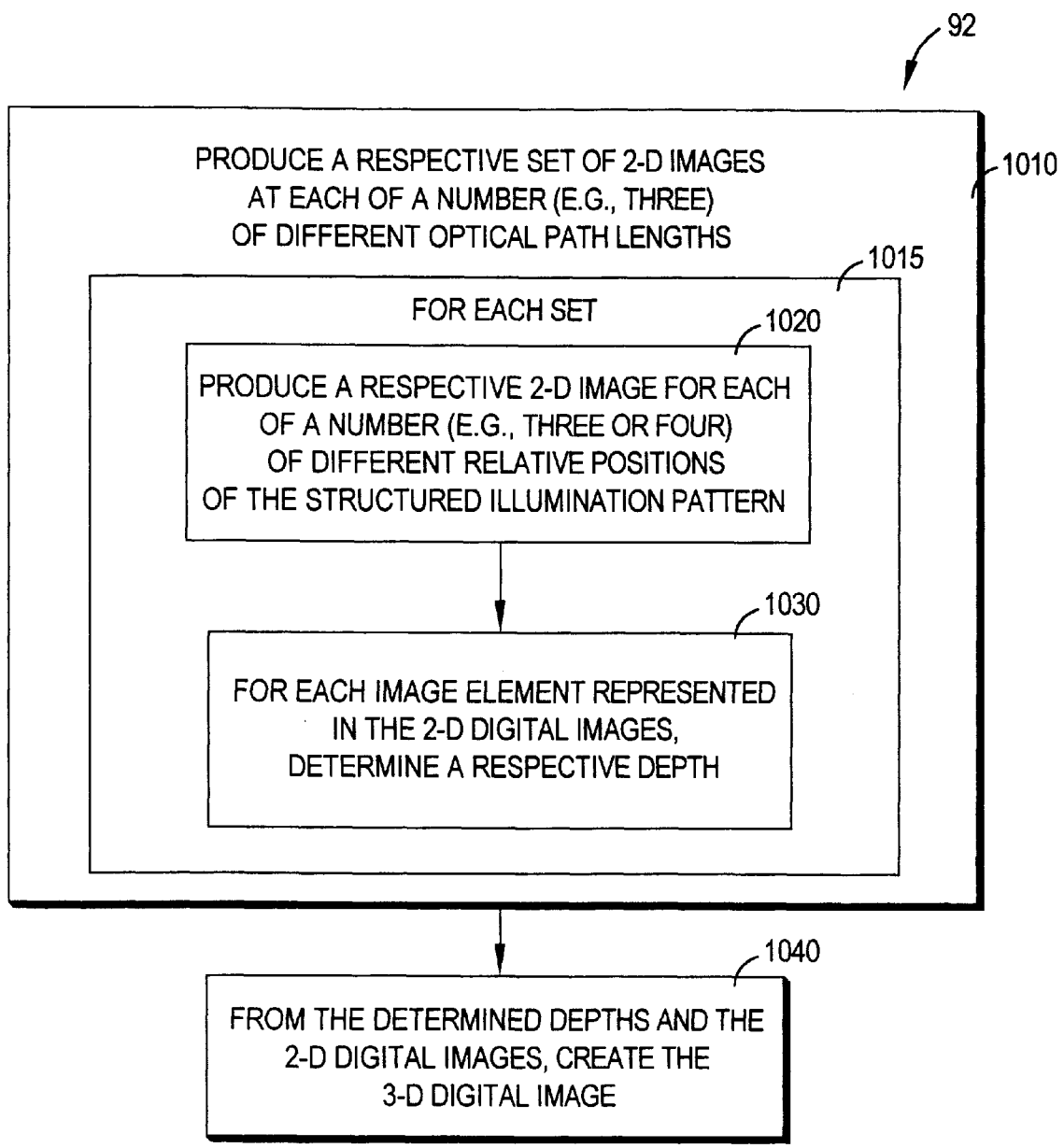
FIGS. 10–11 are flow diagrams of procedures.
Figure 11:
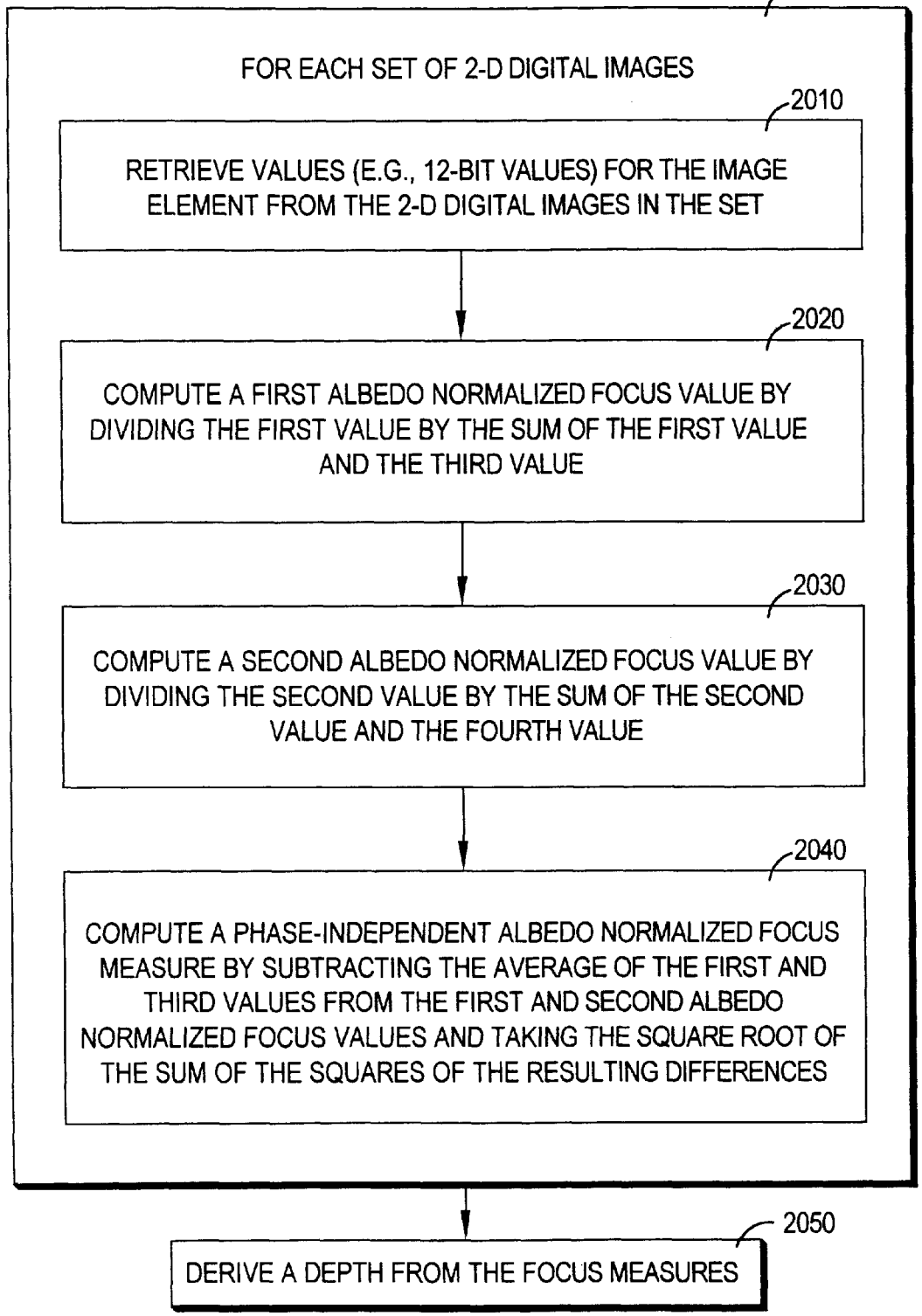

FIGS. 10 and 11 illustrate procedures 92 and 94, respectively, that use the 2-D digital images. Procedure 92 is executed by the 3-D imager to derive the 3-D digital image from the 2-D digital images. The depth determiner executes procedure 94 to determine a depth for an image element.

According to procedure 92, a respective set of 2-D images is produced at each of a number (e.g., three or more) of different optical path lengths controlled by the optical path length changer (step 1010). For each set (step 1015), the image source produces a respective 2-D image for each of a number (e.g., three or four) of different relative positions of the structured illumination pattern (step 1020). For example, with respect to FIG. 9, each set may include 2-D images for the phase positions of 0, 90, 180, and 270 degrees, respectively, shown in portions 190, 192, 194, and 196, respectively. The changes in position are effected by the illumination positioner 32 such as the piezo-electric element 52 that moves the patterned mask 42 in implementation 36. Each image element represented in the 2-D digital images 14 defines a respective point. At each point the depth determiner determines a respective depth step 1030). From the determined depths and the 2-D digital images, the image processing system 10 creates the 3-D digital image (e.g., image 16 of FIG. 2) (step 1040).

According to procedure 94 for determining a depth at point defined by an image element (e.g., element F1 shown in FIGS. 7, 9), for each set of 2-D digital images (each set corresponding to a different optical path length as described above) (step 2005), at least the following steps 2010–2040 are executed. The depth determiner retrieves values (e.g., 12-bit values) for the image element from the 2-D digital images in the set (e.g., values 0.9, 0.5, 0.1, 0.5 for portions 190, 192, 194, 196, respectively) (step 2010). A first albedo normalized focus value is computed by dividing the first value by the sum of the first value and the third value (e.g., 0.9/(0.9+0.1)=0.9) (step 2020). A second albedo normalized focus value is computed by dividing the second value by the sum of the second value and the fourth value (e.g., 0.5/(0.5+ 0.5)=0.5) (step 2030). A phase-independent albedo normalized focus measure is computed by subtracting the average of the first and third values (e.g., 0.5) from each of the albedo normalized focus values and taking the square root of the sum of the squares of the resulting differences (e.g., square root of $(0.90-0.5)^2+(0.5-0.5)^2=0.4$) (step 2040).

As explained in the Albedo Normalization application, a depth is derived from the focus measures (step 2050).

Figure 12:
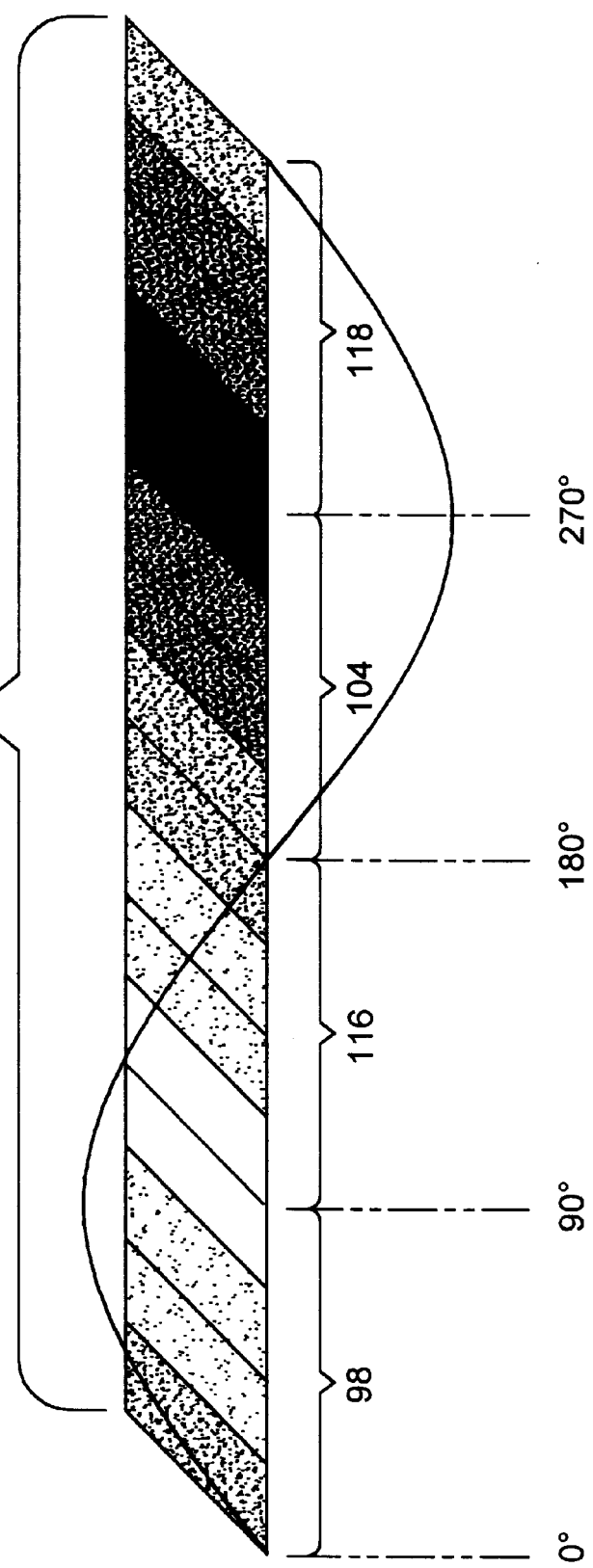
FIG. 12 is a diagram of a period of a patterned mask.
Figure 13:
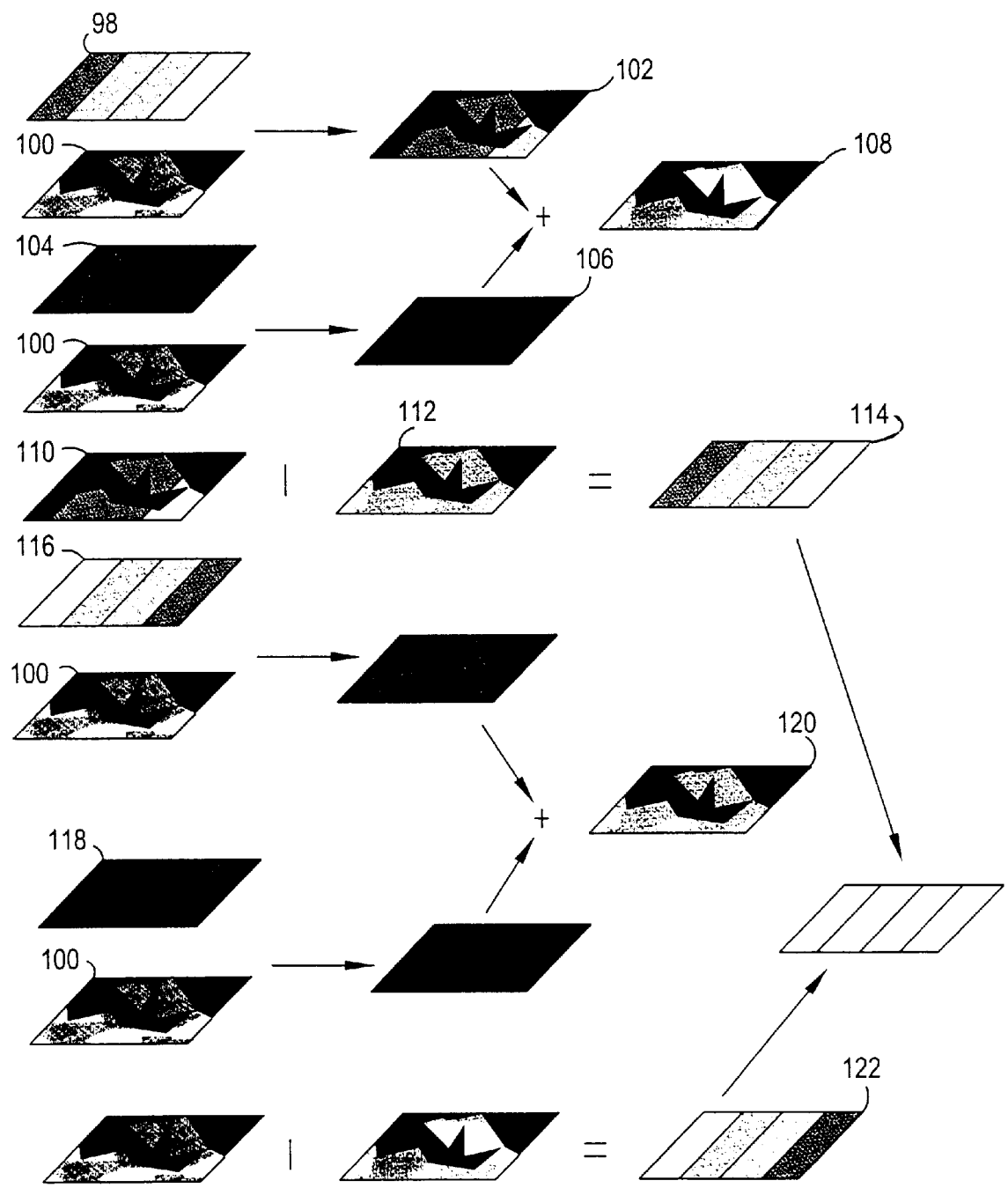
FIG. 13 is an illustration of an application of the patterned mask of FIG. 12.

FIGS. 12, 13 illustrate deriving the focus measure in accordance with procedure 94 (described above), for a point defined by an image element. FIG. 12 displays a period 96 of a pattern mask that changes sinusoidally from dark to light. As shown in FIG. 13, a 0-degrees section 98 of the period is applied to a subject surface area 100 that bears a pre-existing pattern, to produce 0-degrees illuminated area 102 that corresponds to the first value of the image element (i.e., to the image element's value in the first 2-D digital image). A 180-degrees section 104 that is 180 degrees out of phase with the 0-degrees section is applied to the same subject surface area, to produce a 180-degrees illuminated area 106 which corresponds to the third value of the image element. A first summation area 108 illustrates that the sum of the first and third values corresponds to illuminating area 100 with unmasked light. Areas 110 and 112 are equivalent to the 0-degrees illuminated area and the first summation area, respectively, and illustrate that dividing the first value by the sum of the first and third values removes any effects of the pre-existing pattern, producing the first albedo normalized focus value which is represented in FIG. 13 by area 114.

Also shown in FIG. 13 are a 90-degree section 116, a 270-degree section 118, and a second summation area 120 that similarly illustrate that dividing the second value by the sum of the second and fourth values removes any effects of the pre-existing pattern, producing the second albedo normalized focus value which is represented by area 122.

In at least some cases, for the purposes of computing the focus measure, it may be possible to treat the sum of the first and third values as equivalent to the sum of the second and fourth values, because both sums correspond to illuminating the subject surface area with unmasked light. In such cases, the fourth value (and the 2-D digital image from which the fourth value is retrieved) need not be acquired at all, and the second albedo normalized focus value is computed by dividing the second value by the sum of the first value and the third value.

Figure 14:
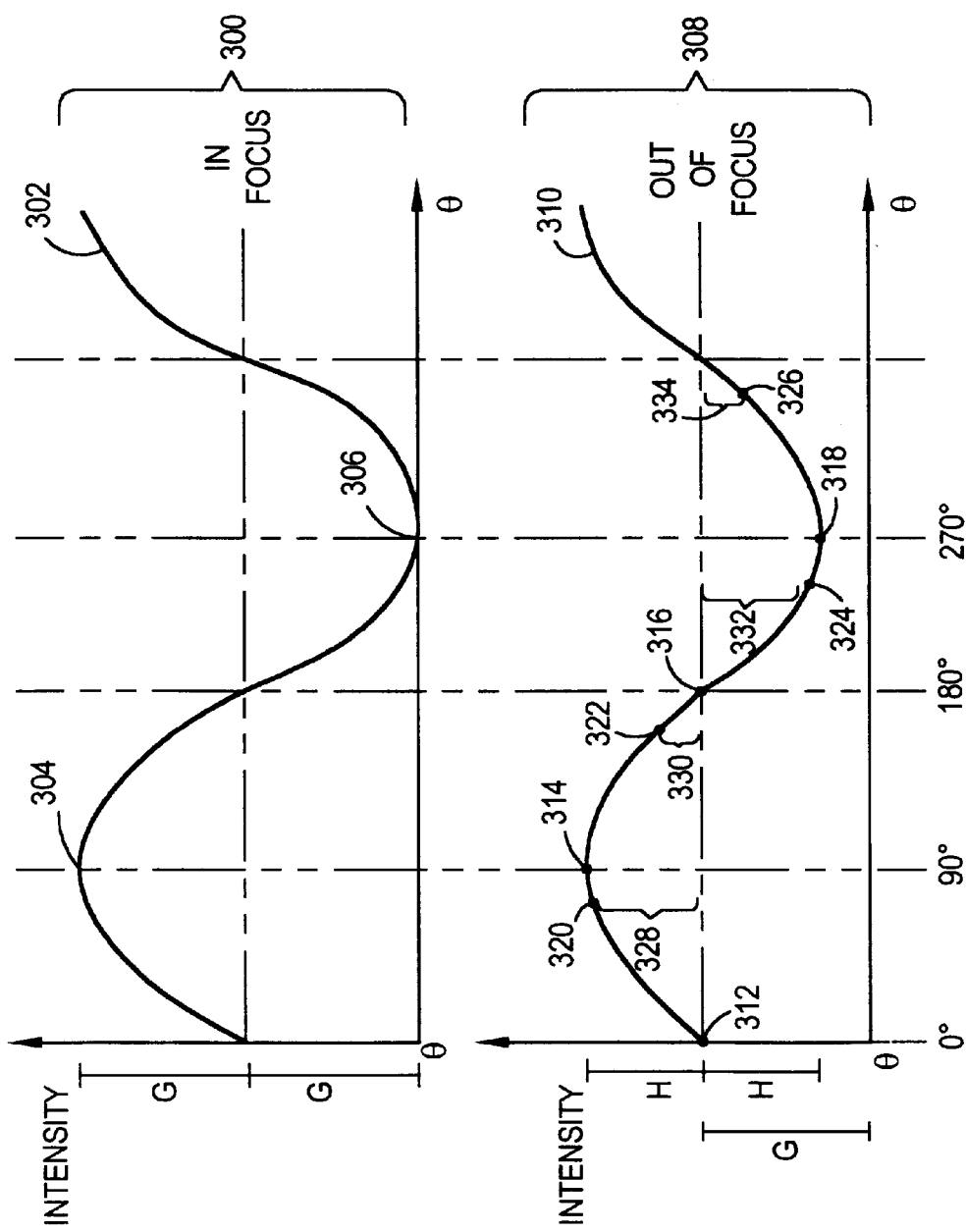
FIG. 14 is an illustration of graphs useful for understanding the procedures of FIGS. 10–11.

FIG. 14 illustrates mathematics and optics principles underlying the use of procedure 94 with a sinusoidal pattern mask based on period 96 (FIG. 12). Graph 300 includes an intensity curve 302 for an albedo-normalized light pattern from an in-focus surface. Curve 302 shows how the intensity produced at an in-focus surface point defined by an image element depends on the phase position of the pattern mask relative to the surface point, i.e., depends on which part of the pattern mask is used in the illumination of the surface point. For example, if the phase position is 0 degrees or 90 degrees, the intensity is G or 2G, respectively.

Apex 304 and nadir 306 represent maximum intensity (i.e., 2G) and minimum intensity (i.e., 0), respectively, corresponding to areas of maximum and minimum transmittance, respectively, in period 96. Since the light pattern has a mean intensity of G (i.e, the average of the first and third values in procedure 94), curve 302 may be described by the equation intensity=G+G sin ($\theta$), where $\theta$ represents a point of the pattern mask.

In FIG. 14, graph 308 shows an intensity curve 310 for an albedo-normalized light pattern from an out-of-focus surface. Curve 310 shows that, according to optics principles, the light pattern for the out-of-focus surface has the same mean intensity of G, but has less acute maximum and minimum intensities, i.e., G+H and G−H, respectively. Thus, curve 310 may be described by the equation intensity G+H sin ($\theta$). The phase-independent albedo normalized focus measure computed in procedure 94 is a measure of H, and the contrast measurement is equal to H/G. According to optics principles as shown in FIG. 8, the value of H and therefore the contrast measurement decrease predictably as the surface becomes more out-of-focus, which allows depth to be calculated.

With respect to FIG. 14 and an image element that defines the point at which the depth is calculated, if the pattern mask is aligned so accurately with the image element that the four values for the image element correspond exactly to curve points 312, 314, 316, and 318, respectively, the values of G and H can be determined in the following straightforward way. In such a case, G is equal to the intensity at curve point 312 (and at curve point 316) and H is equal to the difference between the intensities at curve points 314 and 312, respectively (and at curve points 316 and 318, respectively).

However, the alignment of the pattern mask may not be so accurate, and may cause the four values to correspond to other curve points such as curve points 320, 322, 324, and 326, respectively, each separated by 90 degrees. Thus, as shown in procedure 94, G and H are determined in a way that is generic to both the accurate and not so accurate cases. Consistent with the mathematical principle of symmetry in sinusoidal curves, G is determined by taking the average of the intensities at curve points 320 and 324, respectively (or at curve points 322 and 326, respectively). Due to the nonlinearity of curve 310, H cannot be determined simply by adding the difference 328 between the intensity at curve point 320 and G to the difference 330 between the intensity at curve point 322 and G. Instead, consistent with another mathematical principle of sinusoidal curves, H is determined by taking the square root of the sum of the squares of the differences 328 and 330 (or of differences 332 and 334 as shown in FIG. 14).

It may be advantageous for the albedo normalized focus values to correspond to a zero-centered range to balance the contributions of image element values that represent extremely dark and extremely light intensities, respectively. This may be accomplished by subtracting a constant before computing the phase-independent albedo normalized focus measure.

In at least some cases, it is advantageous for the period of the pattern to be long enough with respect to the image elements that each image element is at least nearly fully exposed to unmasked light in at least one of the 0, 90, 180, and 270 degrees positions described above.

The optical path length may be changed optically (e.g., as described above) or physically or both.

An implementation of the image processing system may include a computer having a data memory for storing the digital images, a program memory for storing software instructions including depth determiner software instructions, and a processor that executes according to the software to implement at least the depth determiner.

The technique (i.e., one or more of the procedures described above) may be implemented in hardware or software, or a combination of both. In at least some cases, it is advantageous if the technique is implemented in computer programs executing on programmable computers that each include a processor, a storage medium readable by the processor (including volatile and non-volatile memory and/or storage elements), at least one input device such as a keyboard, and at least one output device. Program code is applied to data entered using the input device to perform the procedure described above and to generate output information. The output information is applied to one or more output devices.

In at least some cases, it is advantageous if each program is implemented in a high level procedural or object-oriented programming language such as Microsoft C or C++ to communicate with a computer system. The programs can be implemented in assembly or machine language, if desired. In any case, the language may be a compiled or interpreted language.

In at least some cases, it is advantageous if each such computer program is stored on a storage medium or device (e.g., ROM or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other embodiments are within the scope of the following claims. For example, the patterned mask may include a checkerboard pattern. To adjust the relative position of the structured illumination and the subject, the illumination positioner may physically move the patterned mask or the subject or both. In addition or instead, the illumination positioner may adjust the relative position by altering the patterned mask itself, which is possible where the patterned mask relies on a technology (e.g., liquid crystal technology) that allows changes to be made to a mask point's ability to pass light. The image element may be illuminated by any source of illumination or combination of sources of illumination that allows a focus measure to be taken for a surface.

What is claimed is:

1. A method for deriving a three-dimensional image from two-dimensional images of a subject, the method comprising:

for each of the two-dimensional images, imposing different structured illumination, including a pattern, on the subject;

producing the two-dimensional images from the subject under the structured illumination;

deriving a focus measurement for each pixel of at least one of the two-dimensional images, deriving focus-based depth measurements from the two-dimensional images, each of the derived focus-based depth measurements being derived from the focus measurements; and from the two-dimensional digital images and the depth measurements, deriving the three-dimensional image, wherein the three-dimensional image includes information about a subject, each of the two dimensional images includes different information about the subject, each instance of imposed structured illumination includes a same pattern having a spatial period, and for the instances of imposed structured illumination, the respective positions of the pattern relative to the subject differ by a fraction of the spatial period.

2. The method of claim 1, wherein: the fraction includes a multiple of a quarter of the spatial period.

3. A method for deriving a three-dimensional image from two-dimensional images, the method comprising:

deriving a focus measurement for each pixel of at least one of the two-dimensional images;

deriving focus-based depth measurements from the two dimensional images, a number of derived focus-based depth measurements being substantially equal to a number of pixels of the at least one of the two-dimensional images, each focus-based depth measurement being derived from the focus measurements; and from the two-dimensional digital images and the depth measurements, deriving the three-dimensional image, wherein:

the three-dimensional image includes information about a subject;

each of the two-dimensional images includes different information about the subject;

the subject bears a contrast pattern; and the method further comprises, in the derivation of the focus-based depth measurements, excluding at least some information about the contrast pattern.

4. A method for use in processing a digital image, the method comprising:

imposing structured illumination, including a pattern, on a subject;

producing two-dimensional images from the subject under the structured illumination, at least one of the two-dimensional images having a predetermined resolution, each of the two-dimensional images including different information about the subject;

from the two-dimensional digital images, deriving focus measurements;

from the focus measurements, deriving depth measurements; and from the two-dimensional digital images and the depth measurements, deriving a three-dimensional image having the predetermined resolution, wherein:

for each of the two-dimensional images, different structured illumination is imposed on the subject, each instance of imposed structured illumination includes a same pattern having a spatial period; and for the instances of imposed structured illumination, the respective positions of the pattern relative to the subject differ by a fraction of the spatial period.

5. The method of claim 4, wherein:

the fraction includes a multiple of a quarter of the spatial period.

6. A method for use in processing at digital image, the method comprising:

imposing structured illumination, including a pattern, on a subject;

producing two-dimensional images from the subject under the structured illumination, at least one of the two-dimensional images having a predetermined resolution, each of the two-dimensional images including different information about the subject;

from the two-dimensional digital images, deriving focus measurements;

from the focus measurements, deriving depth measurements; and from the two-dimensional digital images and the depth measurements, deriving a three-dimensional image having the predetermined resolution, wherein:

the subject bears a contrast pattern; and the method further comprises, in the derivation of the depth measurements, excluding at least some information about the contrast pattern.

* * * * *